United States Patent
Singh et al.

(10) Patent No.: US 9,143,953 B1
(45) Date of Patent: *Sep. 22, 2015

(54) METHODS AND DEVICES FOR USING SILENCE INTERVALS TO ENHANCE WIRELESS COMMUNICATIONS

(71) Applicant: Sprint Spectrum L.P., Overland Park, KS (US)

(72) Inventors: Jasinder P. Singh, Olathe, KS (US); Ashish Bhan, Shawnee, KS (US); Jason P. Sigg, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/900,029

(22) Filed: May 22, 2013

Related U.S. Application Data

(63) Continuation of application No. 12/647,966, filed on Dec. 28, 2009, now Pat. No. 8,462,651.

(51) Int. Cl.
*H04W 24/00* (2009.01)

(52) U.S. Cl.
CPC .................... *H04W 24/00* (2013.01)

(58) Field of Classification Search
None
See application file for complete search history.

(56) References Cited

U.S. PATENT DOCUMENTS

| | | | |
|---|---|---|---|
| 7,450,950 B2 | 11/2008 | Kim et al. | |
| 7,454,174 B2 | 11/2008 | Stein et al. | |
| 8,462,651 B1 | 6/2013 | Singh et al. | |
| 2004/0162101 A1 | 8/2004 | Kim et al. | |
| 2005/0013283 A1 | 1/2005 | Yoon et al. | |
| 2005/0243867 A1 | 11/2005 | Petite | |
| 2006/0159045 A1 | 7/2006 | Ananthaiyer et al. | |
| 2007/0032983 A1* | 2/2007 | Zeidan | 702/179 |
| 2007/0049314 A1 | 3/2007 | Balachandran et al. | |
| 2008/0130483 A1* | 6/2008 | Khandekar et al. | 370/208 |
| 2008/0198802 A1 | 8/2008 | Zhang et al. | |
| 2008/0232304 A1 | 9/2008 | Mooney et al. | |
| 2008/0268863 A1 | 10/2008 | Pedersen et al. | |

(Continued)

OTHER PUBLICATIONS

Pearce, Jim, Spread Spectrum Scene, Eb/NO Explained, downloaded from the World Wide Web at http://www.sss-mag.com/ebn0.html on Dec. 11, 2009, pp. 1-10.

(Continued)

*Primary Examiner* — Benjamin H Elliott, IV

(57) ABSTRACT

Methods and devices for transmission of communications during a silence interval are described. A base station (BS) provides timing data to an access terminal (AT) and AT uses timing data to synchronize with BS to carry our silence and non-silence intervals for an RF air interface. AT attempts to initiate communications by transmitting an access probe (AP) to BS during a non-silence interval. Other ATs may transmit communications to BS during non-silence interval. If BS acknowledges AP during non-silence interval, AT does not transmit during a subsequent silence interval. If AP was for an emergency communication and BS does not acknowledge AP sent during non-silence interval, AT transmits another AP during the subsequent silence interval to initiate emergency communication. If AP was not for emergency communication, AT does not transmit AP during the subsequent silence interval. The other ATs do not transmit communications to BS during the subsequent silence interval.

20 Claims, 6 Drawing Sheets

(56) References Cited

U.S. PATENT DOCUMENTS

| | | |
|---|---|---|
| 2009/0137262 A1 | 5/2009 | Willenegger et al. |
| 2009/0164657 A1 | 6/2009 | Li et al. |
| 2011/0044300 A1 | 2/2011 | Joshi et al. |
| 2012/0178407 A1 | 7/2012 | Rudolf et al. |

OTHER PUBLICATIONS

Pollack, Christine, Guide to RF Duplexer, downloaded from the World Wide Web at http://www.work.com/taskonomy/business_type.new_guides/rf-duplexer-17374/print.asp on Nov. 14, 2009, pp. 1-2.

IS-95 cdmaOne, downloaded from the World Wide Web at http://www.mobileisgood.com/IS95_cdmaOne.php on Nov. 9, 2009, pp. 1-3.

Triquint Semiconductor, Inc., 836.5/881.5 MHz SAW Duplexer, Part No. 856495, Data Sheet, Rev. D, Mar. 2007, pp. 1-6.

Anderson, Ola et al., GSM transport evolution, Ericsson Review No. 1, 2007, pp. 26-31.

Rosu, Iulian, Understanding Noise Figure, downloaded from the World Wide Web at http://www.qsl.net/va3iu/Noise/noise.html on Dec. 11, 2009, pp. 1-12.

Baxter, Scott 1Xev-do "Call Processing" Air Interface, Connections, Sessions, Course 342 v. 1.0, Feb. 2007, pp. 1-114.

Wikipedia, Eb/N0, downloaded from the World Wide Web at http://en.wikipedia.org/wiki/Eb/N0 on Dec. 11, 2009, pp. 1-4.

Wikipedia, Noise (electronics), downloaded from the World Wide Web at http://en.wikipedia.org/wiki/Electrical_noise on Dec. 11, 2009, pp. 1-4.

Wikipedia, Rise over thermal, downloaded from the World Wide Web at http://en.wikipedia.org/wiki/Rise_over_thermal Oct. 9, 2009, 1 page.

Hughes Systique, HSCTechnicalWiki, Main—Evolution-Data Optimized, Nov. 11, 2009, downloaded from the World Wide Web at http://wiki.hsc.com/pmwiki/Main/EVDO, pp. 1-9.

3rd Generation Partnership Project 2 "3GPP2" cdma2000 High Rate Packet Data Air Interface Specification, Version 4.0, Oct. 25, 2002, 300 pages (cover to 6-117).

3rd Generation Partnership Project 2 "3GPP2" cdma2000 High Rate Packet Data Air Interface Specification, Version 4.0, Oct. 25, 2002, 248 pages (pp. 7-1 to 11-8).

\* cited by examiner

METHODS AND DEVICES FOR USING SILENCE INTERVALS TO ENHANCE WIRELESS COMMUNICATIONS

This application is a continuation application of prior U.S. patent application Ser. No. 12/647,966, filed Dec. 28, 2009. This application incorporates by reference U.S. patent application Ser. No. 12/647,966.

BACKGROUND

Access terminals, such as cell phones and personal digital assistants (PDAs), are operable to communicate with radio access networks, such as cellular wireless networks. These access terminals and access networks typically communicate with each other over a radio frequency (RF) air interface according to a wireless protocol such as 1x Evolution Data Optimized (1x Ev-DO), perhaps in conformance with one or more industry specifications such as IS-856, Revision 0, IS-856, Revision A, and IS-856, Revision B. Other wireless protocols may be used as well, such as Code Division Multiple Access (CDMA), Global System for Mobile Communications (GSM), Time Division Multiple Access (TDMA), and/or some other wireless protocol.

Access networks typically provide services such as voice, text messaging (such as Short Message Service (SMS) messaging), and packet-data communication, among others. Access networks typically include a plurality of base stations, each of which provides one or more coverage areas, such as cells and sectors (i.e., individual areas of a cell that allow the cell to carry more calls). When an access terminal is positioned in one of these coverage areas, it can communicate over the air interface with the base station, and in turn over one or more circuit-switched and/or packet-switched signaling and/or transport networks to which the base station provides access.

Access terminals and access networks may conduct communication sessions (e.g. voice calls and data sessions) over a pair of frequencies known as carriers, with a base station of an access network transmitting to an access terminal on one of the frequencies, and the access terminal transmitting to the base station on the other. This is known as frequency division duplex (FDD). A base-station-to-access-terminal communication link is known as the forward-link, while an access-terminal-to-base-station communication link is known as the reverse-link. Each of the base stations may transmit one or more pilot signals to the access terminals in the base station's coverage area via the forward-link. The access terminals may use the pilot signals to determine which base station(s) and/or sector(s) to use to conduct a communication session. The access terminals may transmit one or more access probes via the reverse-link to initiate a communication session.

Overview

An example access network that includes a base station may synchronize with one or more access terminals to carry out silence and non-silence intervals for an RF air interface. Synchronization may be based on timing data transmitted from the base station to the access terminal(s). One or more of the access terminals may attempt to initiate a communication session by transmitting an access probe to the base station during a non-silence interval. During the non-silence interval, the base station may transmit an access probe acknowledgment to the access terminal that transmitted the access probe.

If the access probe was transmitted during a non-silence interval to initiate a non-emergency communication and if the access terminal does not receive an access probe acknowledgment during the non-silence interval, then the access terminal may refrain from transmitting an access probe and any other communications via the air interface during the silence interval that follows the non-silence interval. On the other hand, if the access probe was transmitted during a non-silence interval to initiate an emergency communication and if the access terminal does not receive an access probe acknowledgment during the non-silence interval, then the access terminal may transmit another access probe during the silence interval that follows the non-silence interval.

In one respect, an example embodiment may be arranged in the form of a method that comprises (i) a base station detecting initiation of a silence interval for a reverse-link air interface, wherein one or more access terminals are synchronized with the base station to detect initiation of the silence interval, and wherein each of the one or more access terminals refrain from transmitting communications on the reverse-link air interface during the silence interval unless transmitting an access probe to initiate an emergency communication, (ii) during the silence interval, the base station initiating a measurement, and (iii) during the silence interval, the base station monitoring the reverse-link air interface to determine whether any of the one or more access terminals transmitted an access probe via the reverse-link air interface during the silence interval.

In another respect, an example embodiment may be arranged in the form of a method that comprises (i) an access terminal detecting initiation of a non-silence interval for a reverse-link air interface, (ii) during the non-silence interval, the access terminal transmitting to a base station via the reverse-link air interface a first access probe to initiate an emergency communication, (iii) the access terminal detecting that the access terminal did not receive from the base station an access probe acknowledgment in response to transmitting the first access probe, (iv) the access terminal detecting initiation of a silence interval for the reverse-link air interface, and (v) during the silence interval, the access terminal transmitting to the base station via the reverse-link air interface a second access probe to initiate the emergency communication.

In another respect, an example embodiment may be arranged as a base station that is operable in a wireless communication network. The base station may comprise (i) a transceiver that is operable to transmit communications to one or more access terminals via a forward-link air interface and receive communications from the one or more access terminals via a reverse-link air interface, (ii) a processor, and (iii) a data storage device that contains computer-readable program instructions. The program instructions may includes program instructions that are executable by the processor to detect initiation of a silence interval for the reverse-link air interface, initiate a measurement during the silence interval, and monitor communications received via the transceiver during the silence interval so as to determine whether the transceiver received an access probe from at least one of the one or more access terminals during the silence interval.

In yet another respect, an example embodiment may arranged as an access terminal that comprises (i) a processor, (ii) a data storage device that contains computer-readable program instructions that are executable by the processor, and (iii) a transceiver that is operable to transmit access probes and other reverse-link communications to a base station via a reverse-link of an air interface and receive access probe acknowledgments and other forward-link communications from the base station via a forward-link of the air interface. The computer-readable program instructions may comprise program instructions that are executable to cause the processor to (i) detect that the transceiver transmitted a first access probe to the base station during a non-silence interval, (ii) detect initiation and termination of a silence interval, and (iii) make a determination of whether the transceiver has received from the base station an access probe acknowledgment in response to the first access probe. If the processor makes a determination that the transceiver has received the access probe acknowledgment in response to the first access probe, then during the silence interval, the transceiver does not transmit a second access probe or any other reverse-link communications via the reverse-link of the air interface. If the processor makes a determination that the transceiver has not received the access probe acknowledgment in response to the first access probe, then during the silence interval, the transceiver transmits the second access probe to the base station via the reverse-link of the air interface.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

Figure 1:
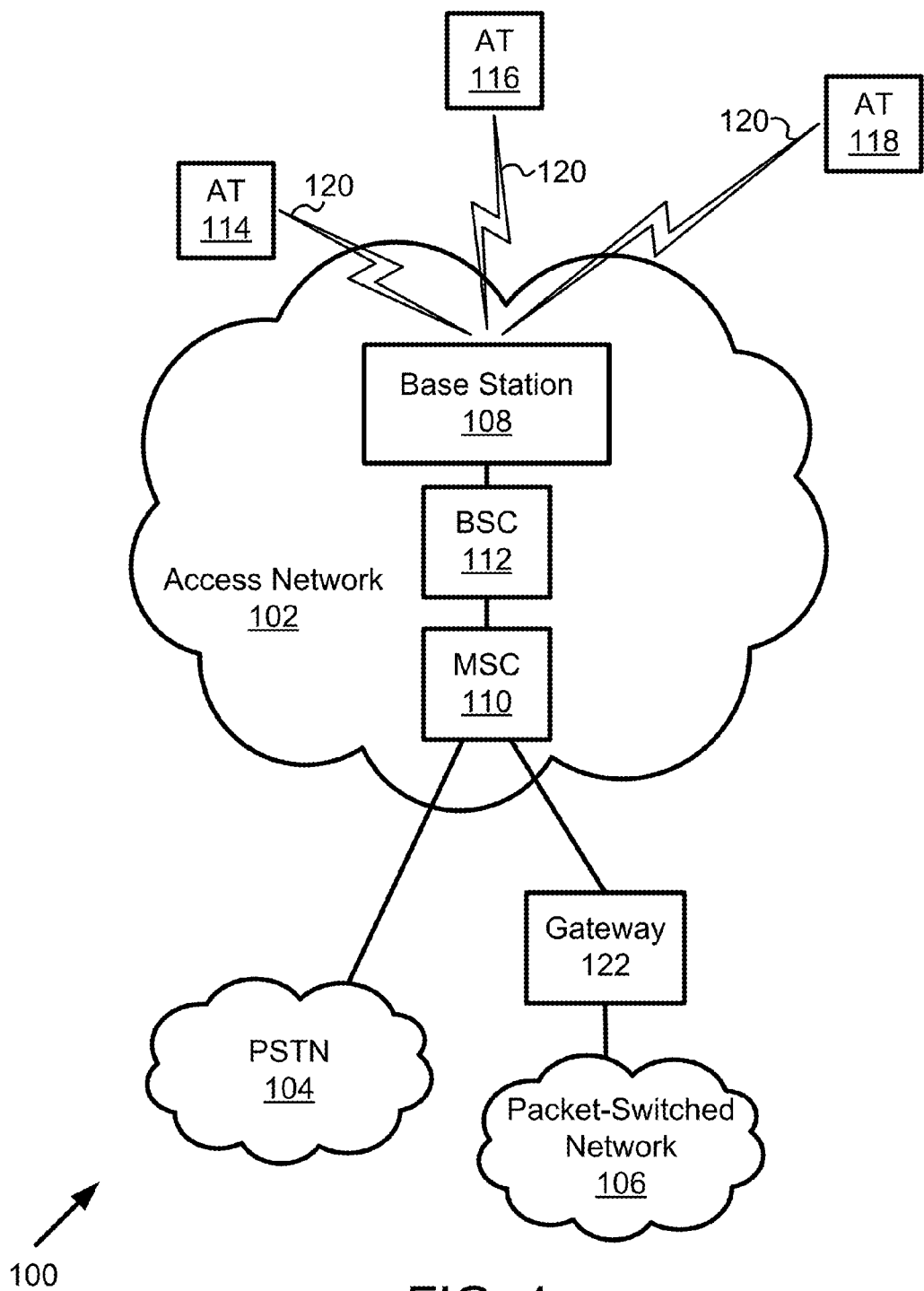
FIG. 1 is a simplified block diagram of an example network in which example methods may be carried out.

FIG. 1 is a simplified block diagram of a network 100 in which example methods can be carried out. It should be understood, however, that this and other block diagrams, communication flows, and flow charts are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (e.g., machines, interfaces, functions, orders, and groupings of functions, etc.) can be used instead. Furthermore, various functions described as being performed by one or more elements may be carried out by a processor executing computer-readable program instructions and/or by any combination of hardware, firmware, and software.

As illustrated in FIG. 1, network 100 includes an example access network 102 (also known as a radio access network (RAN)), a public-switched telephone network (PSTN) 104, and a packet-switched network 106. Access network 102 includes a base station 108, a mobile switching center (MSC) 110, and a base station controller (BSC) 112. BSC 112 controls the operation of base station 108 and is connected to MSC 110 so as to provide connectivity between access terminals that communicate with access network 102 and devices that operate on the PSTN. MSC 110 is also connected to a gateway 122 that provides connectivity of access network 102 and packet-switched network 106 so that communications may be carried out between access terminals that communicate with access network 102 and devices that operate on packet-switched network 106. By way of example, gateway 122 may comprise a packet data serving node (PDSN) or some other type of gateway.

During example operation, base station 108 may communicate (e.g., carry out communications) with one or more access terminals, such as one or more of access terminals 112, 114, 116 via a forward-link and a reverse-link of an RF air interface 120. The communications carried out via the forward-link, the reverse-link, or both the forward-link and the reverse-link of air interface 120 may be arranged in accordance with an air interface protocol, examples of which include the CDMA (e.g., IS-95, IS-2000, 1xRTT, 1xEV-DO, etc.), iDEN, WiMAX, TDMA, GSM, GPRS, UMTS, EDGE, LTE, WI-FI (e.g., IEEE 802.11), and BLUETOOTH air interface protocols. Access terminals 114, 116, 118 may each comprise a cell phone, a PDA, or some other wireless communication device.

Base station 108 is operable to carry out various functions pertaining to silence and non-silence intervals occurring for RF air interface 120. These functions may include, for example, defining when each silence and non-silence interval will occur, generating data that indicates when one or more silence and non-silence intervals will occur, generating timing data useable by an access terminal to determine when one or more silence and non-silence intervals will occur, providing the timing data to the access terminal(s), detecting initiation and/or termination of a silence interval, detecting initiation and/or termination of a non-silence interval, and carrying out network measurements during a silence interval. Base station 108 may provide the timing data to the access terminal by sending a sync message over a sync channel. Additional examples of functions pertaining to a silence and/or non-silence intervals are also possible.

Each access terminal that communicates via base station 108 is operable to carry out various functions pertaining to a silence interval defined for RF air interface 120. As an example, access terminal 114, and/or another access terminal communicating with base station 108, may detect initiation of a silence interval for a reverse-link of RF air interface 120, determine whether a communication should be transmitted via the RF air interface 120 during the silence interval, transmit a communication (e.g., an access probe) via the RF air interface 120 during the silence interval, and refrain from transmitting any communication via the RF air interface 120. Additional examples of functions pertaining to a silence interval and carried out by an access terminal communicating with base station 108 are also possible.

Figure 2:
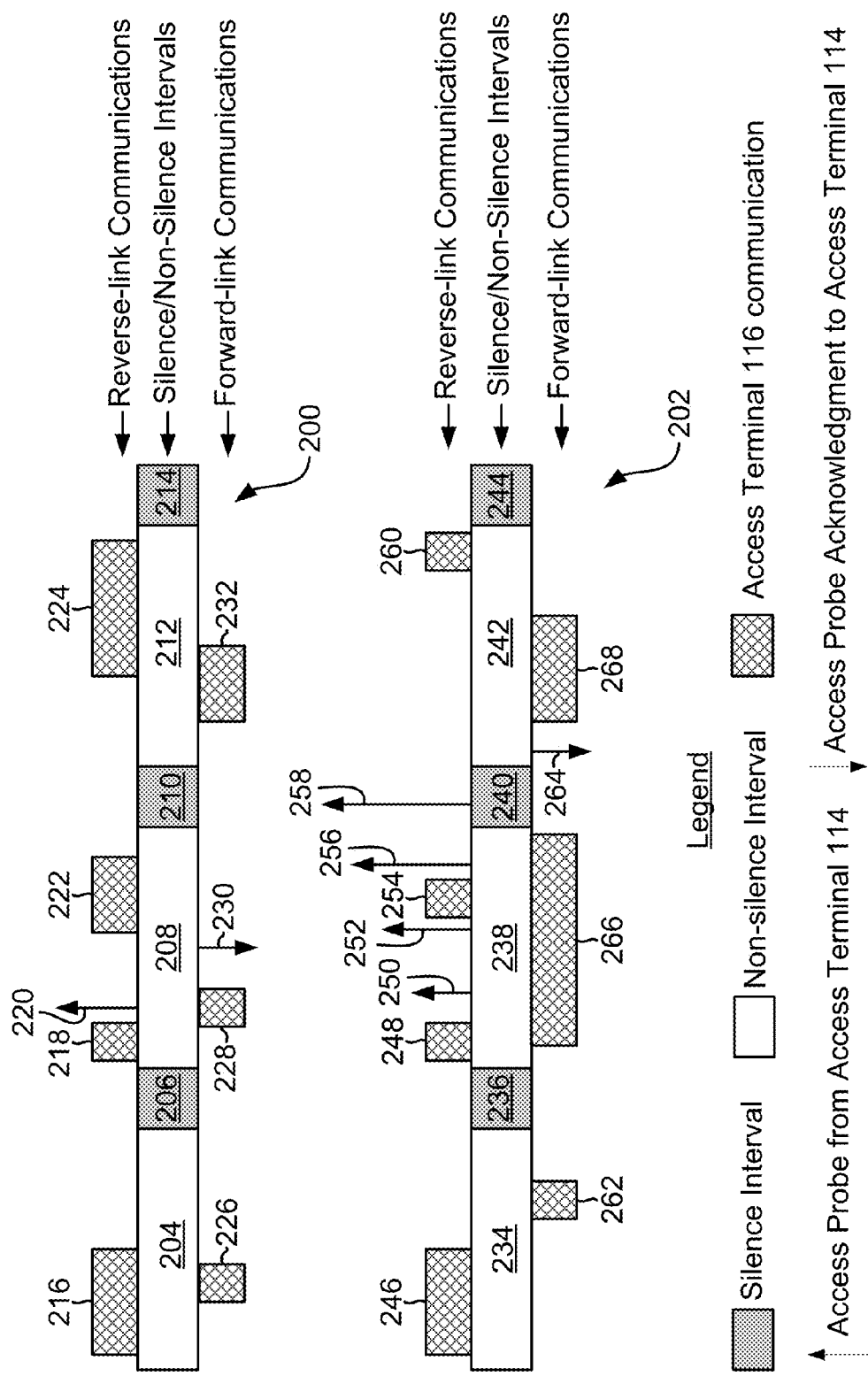
FIG. 2 illustrates example communication flows with respect to silence and non-silence intervals occurring for a radio frequency air interface.

Next, FIG. 2 illustrates example communication flows 200, 202 that may occur via network 100. The top rows of communication flows 200, 202 represent example reverse-link communications that may occur via RF air interface 120. The center rows of communication flows 200, 202 represent example silence and non-silence intervals that may occur for RF air interface 120. The bottom rows of communication flows 200, 202 represent example forward-link communications that may occur via RF air interface 120.

With reference to the legend of FIG. 2, communication flow 200 includes silence intervals 206, 210, 214, non-silence intervals 204, 208, 212, reverse-link communications 216, 218, 222, 224 transmitted from access terminal 116, an access probe 220 transmitted from access terminal 114, forward-link communications 226, 228, 232 transmitted to access terminal 116, and an access probe acknowledgment 230 transmitted to access terminal 114.

With reference to the legend of FIG. 2, communication flow 202 includes silence intervals 236, 240, 244, non-silence intervals 234, 238, 242, reverse-link communications 246, 248, 254, 260 transmitted from access terminal 116, access probes 250, 252, 256, 258 transmitted from access terminal 114, forward-link communications 262, 266, 268 transmitted to access terminal 116, and an access probe acknowledgment 264 transmitted to access terminal 114.

The arrows representing access probes 250, 252, 256, 258 are shown as increasing in size so as to represent an increasing power level of access probes 250, 252, 256, 258. In other words, the larger the arrow, the greater the power level used to transmit the access probe. The arrow for access probe 258 represents the maximum power level used to transmit an access probe. In accordance with an example embodiment, an access probe transmitted during a silence interval may be transmitted at a next incremental power level of a sequence of increasing power levels. Alternatively, an access probe transmitted during a silence interval may be transmitted at the maximum power level for transmitting an access probe, thus skipping one or more incremental power levels for transmitting access probes.

Figure 3:
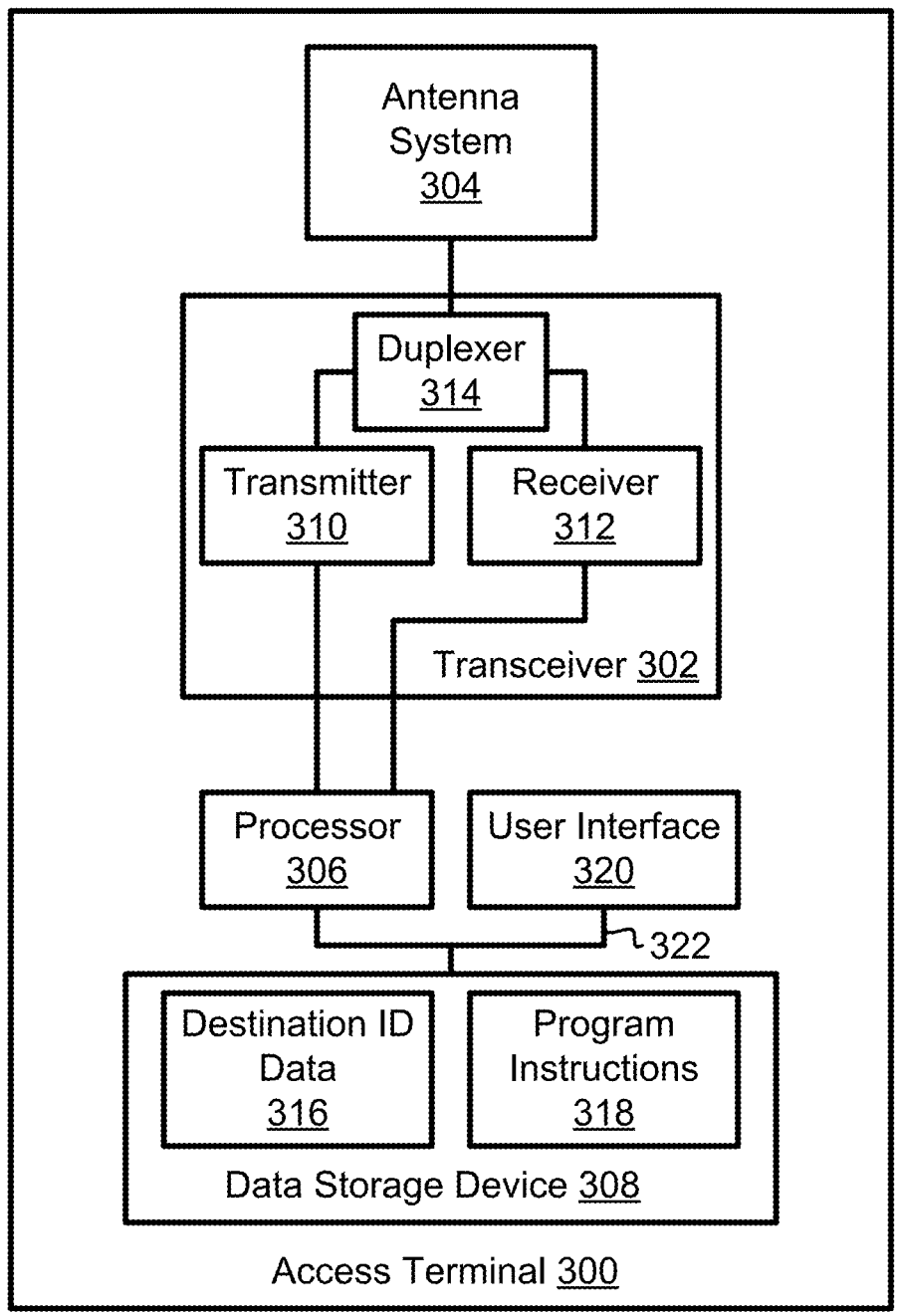
FIG. 3 is a simplified block diagram of an example access terminal.

Next, FIG. 3 is a simplified block diagram of an example access terminal 300. One or more of access terminals 114, 116, 118 may be arranged as example access terminal 300. As illustrated in FIG. 3, access terminal 300 comprises a transceiver 302, an antenna system 304, a processor 306, a data storage device 308, and a user interface 320. Access terminal 300 can operate in any of a variety of operating states including, but not limited to, an idle-mode state, an access-mode state, and a traffic-channel state.

Transceiver 302 is operable to transmit reverse-link communications and receive forward-link communications via an RF air interface, such as RF air interface 120. By way of example, when access terminal 300 operates in the idle-mode state, transceiver 302 may receive forward-link communications via a paging channel of RF air interface 120. These forward-link communications may include a page message for establishing a voice call at access terminal 300. When access terminal 300 operates in the access-mode state, transceiver 302 may transmit one or more access probes to base station 108 and receive one or more access probe acknowledgments from base station 108. When access terminal 300 is operating in the traffic-channel state, transceiver 302 may transmit communications via a reverse-link traffic channel of RF air interface 120 and receive communications via a forward-link traffic channel of RF air interface 120. The communications transmitted via the traffic channels may comprise communications of a voice or data communication session being carried out by access terminal 300.

Transceiver 302 may be arranged in any of a variety of configurations. As illustrated in FIG. 3, transceiver 302 comprises a transmitter 310, a receiver 312, and a duplexer 314 that is connected to transmitter 310 and receiver 312. Duplexer 314 may comprise an RF duplexer that is connected to antenna system 304. In this regard, antenna system 304 may include a single antenna that connects to duplexer 314 and that is operable to transmit and receive RF signals. In an alternative embodiment, antenna system 304 may include multiple antennas, such as a transmit antenna connected directly to transmitter 310 and a receive antenna connected directly to receiver 312. In accordance with this alternative embodiment, transceiver 302 may not include duplexer 314.

Processor 306 may comprise one or more general purpose processors (e.g., INTEL microprocessors) and/or one or more special purpose processors (e.g., digital signal processors). Processor 306 may execute computer-readable program instructions 318 that are stored in data storage device 308.

Data storage device 308 may comprise a computer-readable storage medium readable by processor 306. The computer-readable storage medium may comprise volatile and/or non-volatile storage components, such as optical, magnetic, organic or other memory or disc storage, which can be integrated in whole or in part with processor 306.

Data storage device 308 may contain various data, such as destination identifier (ID) data 316, and computer-readable program instructions 318 that are executable by processor 306. Destination ID data 316 may comprise data associated with carrying out an emergency communication. For example, destination ID data 316 may comprise a destination number such as a telephone number (e.g., 911) for placing an emergency voice call communication. Additionally or alternatively, destination ID data 316 may comprise an e-mail address and/or a uniform resource locator (URL) that is associated with a particular network address on packet-switched network 106. The e-mail address and URL may be associated with an emergency services provider, such as a public safety answering point (PSAP), a police department, or a fire department. The destination ID data 316 may be used in determining whether an access probe contains data for placing an emergency or non-emergency communication.

Computer-readable program instructions 318 may comprise program instructions that are executable by processor 306 to cause access terminal 300 to operate in the operating states described above, and to cause access terminal 300 to transition from one operating state (e.g., the idle-mode state) to another operating state (e.g., the access-mode state).

Computer-readable program instructions 318 may comprise program instructions that are executable by processor 306 to detect initiation and/or termination of a silence interval and initiation and/or termination of a non-silence interval. Execution of these program instructions may be carried out repeatedly so that processor 306 can detect initiation and termination of each silence interval and initiation and termination of each non-silence interval for the reverse-link of an RF air interface.

Computer-readable program instructions 318 may comprise program instructions that are executable by processor 306 to detect the transmission of one or more access probes from access terminal 300, transceiver 302, and/or transmitter 310, and to determine whether the access probe contained data for initiating an emergency or non-emergency communication. Each of the one or more access probes may be transmitted to an RF air interface, such as RF air interface 120, for transmission in turn to base station 108. Further, these program instructions may be executable by processor 306 to determine whether each respective access probe was transmitted during a silence or non-silence interval.

Computer-readable program instructions 318 may comprise program instructions that are executable by processor 306 to determine (e.g., make a determination of) whether access terminal 300, transceiver 302, and/or receiver 312 receives an access probe acknowledgment in response to access terminal 300, transceiver 302, and/or transmitter 310 transmitting one or more access probes. For purposes of this description, these program instructions are referred to as access probe detection (APD) program instructions.

Processor 306 may execute the APD program instructions at various times with respect to a non-silence interval during which the one or more access probes are transmitted. For example, processor 306 may execute the APD program instructions prior to initiation of a silence interval (e.g., silence interval 210) that occurs upon termination of a non-silence interval (e.g., non-silence interval 208) during which one or more access probes are transmitted. As another example, processor 306 may execute the APD program instructions after initiation of and during a silence interval (e.g., silence interval 210) that occurs upon termination of a non-silence interval (e.g., non-silence interval 208) during which one or more access probes are transmitted.

For an embodiment in which access terminal 114 is arranged like access terminal 300, access probes 220, 250, 252, 256, 258 may be transmitted via transceiver 302 and/or transmitter 310. For such an embodiment, processor 306 may execute the APD in response to transceiver 302 and/or transmitter 310 transmitting a single access probe during a non-silence interval (e.g., access probe 220) or a series of access probes sent during a non-silence interval (e.g., access probes 250, 252, 256).

Computer-readable program instructions 318 may comprise program instructions that are referred to in this description as access probe acknowledgment response (APAR) program instructions. In one respect, the APAR program instructions may comprise first APAR program instructions that are executable by processor 306 to cause access terminal 300, transceiver 302, and/or transmitter 310 to refrain from transmitting any reverse-link communications (including access probes) via the reverse-link of RF air interface 120 during a silence interval (e.g., silence interval 210) that is initiated upon termination of a non-silence interval (e.g., non-silence interval 208) during which one or more access probes are transmitted by access terminal 300. The first APAR program instructions may be executed in response to processor 306 making a determination that access terminal 300, transceiver 302, and/or receiver 312 received an access probe acknowledgment in response to access terminal 300, transceiver 302, and/or transmitter 310 transmitting one or more access probes during the non-silence interval 208.

In another respect, the APAR program instructions may comprise second APAR program instructions that are executable by processor 306 to cause access terminal 300, transceiver 302, and/or transmitter 310 to transmit an access probe during a silence interval (e.g., silence interval 240) that is initiated upon termination of the non-silence interval during which the one or more access probes are transmitted (e.g., non-silence interval 238). The access probe may be transmitted to base station 108 via RF air interface 120. The second APAR program instructions may be executed in response to processor 306 making a determination that access terminal 300, transceiver 302, and/or receiver 312 has not received an access probe acknowledgment in response to transmission of the access probes during the non-silence interval 238.

User interface 320 may comprise various components for entering data into access terminal 300. For instance, user interface 320 may include a keypad for entering data into access terminal 300. The keypad may comprise a numeric keypad for entering a phone number, such as an emergency phone number (e.g., 911) for placing an emergency call or a non-emergency phone number for placing a non-emergency call. The keypad may comprise a keypad that includes keys similar to keys found on a QWERTY keyboard of a desktop computer, and this keypad may be operable for entering text for a text message. The keypad may comprise a key for entering data that causes access terminal 300 to transmit an access probe during a non-silence interval, where the access probe contains data for initiating a communication session via base station 108, and the key is labeled with a label such as SEND, DIAL, or TRANSMIT.

A person having ordinary skill in the art will understand that the keys of a keypad may be referred to by other names such as buttons, switches, or some other word. Further, a person having ordinary skill in the art will understand that the keypad may comprise a reconfigurable display screen (e.g., a touch screen) that displays various user-selectable keys.

User interface 320 may comprise various components for presenting data to a user. For instance, user interface 320 may comprise a display device for presenting visual data. The display device may comprise a liquid crystal display or another type of display for presenting a text message, a web-page obtained during a data communication session, streaming video, or some other type of visual data. As another example, user device 320 may include a loud-speaker and electronic circuitry for presenting audible data such as voice communications of a voice call and streaming audio from a web site accessible via packet-switched network 106.

Figure 4:
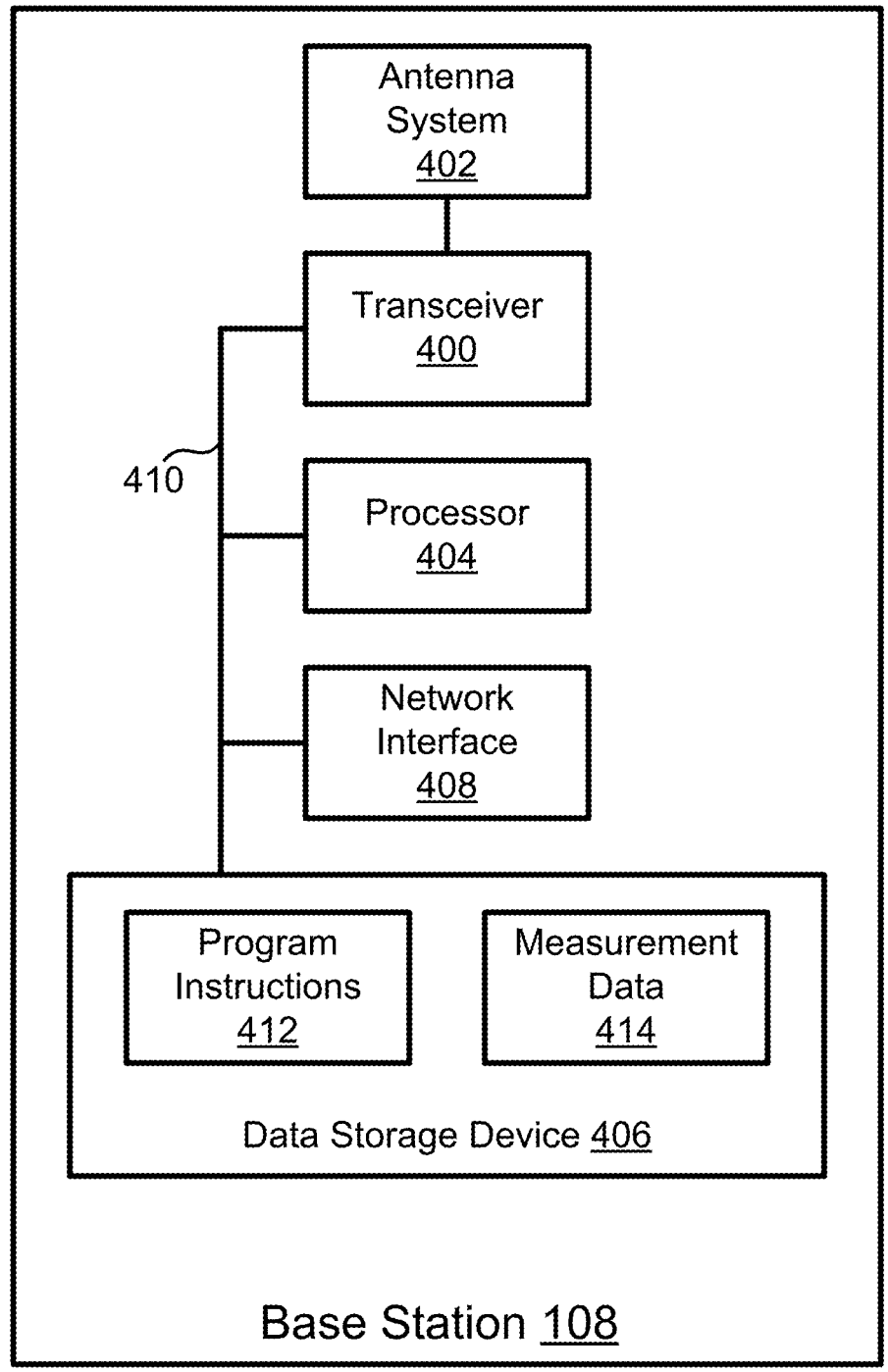
FIG. 4 is a simplified block diagram of an example base station.

Next, FIG. 4 is a simplified block diagram of base station 108. In general, base station 108 is operable in a wireless communication network, such as radio access network 102. In this regard, base station 108 may be operable to radiate RF signals that form a cell and/or one or more sectors of the cell, and base station 108 may terminate radio communications transmitted from one or more access terminals operating within the cell or cells sectors.

As illustrated in FIG. 4, base station 108 comprises a transceiver 400, an antenna system 402, a processor 404, a data storage device 406, and a network interface 408. Two or more components of base station 108 may be linked together via a system bus, network, or other connection mechanism 410. Any function described as being carried out by a component of base station 108 can be described as being carried out by base station 108.

Transceiver 400 is operable to transmit forward-link communications to one or more access terminals, such as one or more of access terminals 114, 116, 118. The forward-link communications may be transmitted via a forward-link of RF air interface 120. The forward-link communications may, for example, include access probe acknowledgments transmitted via a forward-link paging channel, timing data transmitted via a forward-link sync channel, text messages (e.g., SMS messages) transmitted via a forward-link control channel, and voice call or data session (e.g., a world wide web browsing session) communications transmitted via a forward-link traffic channel. The forward-link communications may be arranged in accordance with an air interface protocol, examples of which include the CDMA (e.g., IS-95, IS-2000, 1xRTT, 1xEV-DO, etc.), iDEN, WiMAX, TDMA, GSM, GPRS, UMTS, EDGE, LTE, WI-FI (e.g., IEEE 802.11), and BLUETOOTH air interface protocols.

The timing data, transmitted via the sync channel, may include data that allow one or more access terminals to synchronize with base station 108. As an example, the timing data may include data that allow the one or more access terminals to detect initiation and termination of a silence interval during which base station 108 may perform any of the functions described as being carried out during a silence interval.

Transceiver 400 is operable to receive reverse-link communications from one or more access terminals, such as one or more of access terminals 114, 116, 118. The reverse-link communications may be received via a reverse-link of RF air interface 120. The reverse-link communications may, for example, include access probes transmitted via a reverse-link access channel, and voice or data communications transmitted via a reverse-link traffic channel. The reverse-link communications may be arranged in accordance with an air interface protocol, examples of which include the CDMA (e.g., IS-95, IS-2000, 1xRTT, 1xEV-DO, etc.), iDEN, WiMAX, TDMA, GSM, GPRS, UMTS, EDGE, LTE, WI-FI (e.g., IEEE 802.11), and BLUETOOTH air interface protocols.

Transceiver 400 may be arranged in any of a variety of configurations. For example, transceiver 400 may comprise a transmitter, a receiver, and a duplexer. The duplexer may comprise an RF duplexer that is connected to the transmitter, the receiver, and antenna system 402. In this regard, antenna system 402 may include a single antenna that connects to the duplexer of transceiver 400 and that is operable to transmit and receive RF signals. Alternatively, antenna system 402 may include multiple antennas, such as a transmit antenna connected directly to the transmitter of transceiver 400, and a receive antenna connected directly to the receiver of transceiver 400. In accordance with this alternative arrangement, transceiver 400 may not include a duplexer.

Processor 404 may comprise one or more general purpose processors (e.g., INTEL microprocessors) and/or one or more special purpose processors (e.g., digital signal processors). Processor 404 may execute program instructions 412 that are stored in data storage device 406.

Data storage device 406 may comprise a computer-readable storage medium readable by processor 404. The computer-readable storage medium may comprise volatile and/or non-volatile storage components, such as optical, magnetic, organic or other memory or disc storage, which can be integrated in whole or in part with processor 404. Data storage device 406 may contain program instructions 412, measurement data 414 and/or some other data.

Program instructions 412 comprise computer-readable program instructions that are executable by processor 404. As an example, program instructions 412 may comprise program instructions that are executable by processor 404 to detect initiation of a silence interval for the reverse-link of RF air interface 120. Execution of these program instructions may be carried out repeatedly so that processor 404 can detect initiation of each silence interval for the reverse-link of RF air interface 120. Further, if base station 108 radiates RF signals to form multiple sectors, program instructions 412 may comprise program instructions that are executable by processor 404 to detect initiation of each silence interval for the reverse-link(s) of each sector of base station 108.

Program instructions 412 may comprise program instructions that are executable by processor 404 to detect termination of a silence interval for the reverse-link of RF air interface 120. Execution of these program instructions may be carried out repeatedly so that processor 404 can detect termination of each silence interval for the reverse-link of RF air interface 120. Further, if base station 108 radiates RF signals to form multiple sectors, program instructions 412 may comprise program instructions that are executable by processor 404 to detect termination of each silence interval for the reverse-link(s) of each sector of base station 108.

Initiation of a silence interval may coincide or substantially coincide with termination of a non-silence interval. In this regard, program instruction to detect initiation of a silence interval may include program instructions to detect termination of a non-silence interval. Further, termination of a silence interval may coincide or substantially coincide with initiation of a non-silence interval. In this regard, program instruction to detect termination of a silence interval may include program instructions to detect initiation of a non-silence interval.

Program instructions 412 may comprise program instructions that are executable by processor 404 to initiate a measurement during a silence interval detected by processor 404. Processor 404 may initiate a measurement during each silence interval detected by processor 404. The program instructions to initiate the measurement may include program instructions that cause the measurement to be made during the silence interval. The measurement may comprise any of a variety of measurements, such as a spectral noise density measurement, a thermal noise measurement, or some other measurement.

Measurement data 414 may be obtained and stored in data storage device 406 in response to making the measurement during the silence interval. Measurement data 414 may contain data obtained by making measurements during a plurality of silence intervals. Measurement data 414 may contain data that indicates a calculated average of measurement data obtained for the plurality of silence intervals.

Program instructions 412 may comprise program instructions that are executable by processor 404 to terminate a measurement initiated during the silence interval. Processor 404 may execute the program instructions to terminate the measurement in response to processor 404 determining that base station 108, transceiver 400, and/or a transmitter of transceiver 400 received an access probe during the silence interval from an access terminal that is communicating via base station 108, such as one or more of access terminals 114, 116, 118.

Program instructions 412 may include program instructions that are executable by processor 404 so that measurement data obtained by making a measurement during a given silence interval, during which base station 108, transceiver 400, and/or a transmitter in transceiver 400 received an access probe, is not stored in data storage device 406 or is deleted from data storage device 406. Processor 404 may execute these program instructions in response to processor 404 detecting that the measurement data was obtained during the given silence interval. Alternatively, processor 404 may execute these program instructions in response to executing the program instructions to terminate the measurement by which the measurement data was obtained.

Program instructions 412 may include program instructions that are executable by processor 404 to generate an access probe acknowledgment if base station 108, transceiver 400, and/or a transmitter in transceiver 400 received an access probe during a silence interval. Processor 404 may provide the access probe acknowledgment to transceiver 400 for transmission, via RF air interface 120, to the access terminal that transmitted the access probe during the silence interval. If multiple access terminals transmit a respective access probe during a silence interval, processor 404 may generate a respective access probe acknowledgment for each access terminal and provide the multiple access probe acknowledgments to transceiver 400 for transmission, via RF air interface 120, to the access terminals that transmitted an access probe during the silence interval.

Program instructions 412 may include program instructions that are executable by processor 404 to monitor communications received via base station 108, transceiver 400, and/or a transmitter of transceiver 400 during the silence interval so as to determine whether base station 108, transceiver 400, and/or a transmitter of transceiver 400 received an access probe from at least one of the one or more access terminals during the silence interval. Other examples of program instructions 412 are also possible.

Network interface 408 may be operable to provide connectivity of base station 108 to a BSC, such as BSC 112. As an example, the connectivity between base station 108 and BSC 112 may occur via wired communication circuits for performing time-division multiplexing (TDM), such as T1 circuits. As another example the connectivity between base station 108 and BSC 112 may occur via wired communication circuits for carrying packet communications according to an IP or Ethernet protocol. As yet another example the connectivity between base station 108 and BSC 112 may occur via wireless communications, such as microwave communications.

Figure 5:
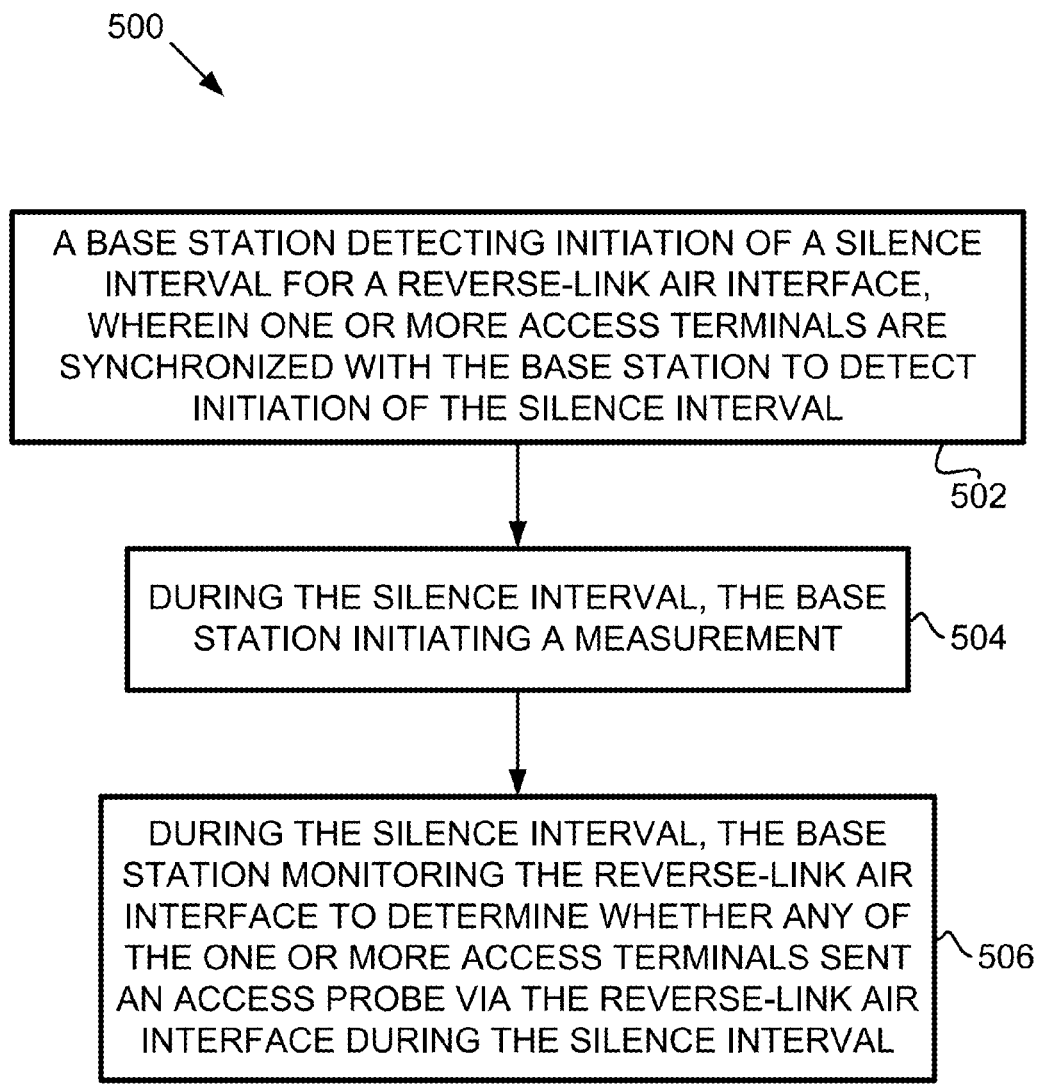
FIG. 5 is a flow chart depicting a set of functions that may be carried out in accordance with an example embodiment.

Turning to FIG. 5, a flow chart illustrating a set of functions 500 that may be carried out in accordance with an example embodiment is provided. The set of functions 500 in FIG. 5 refer to a base station, one or more access terminals, and an air interface. For purposes of this description, the base station referred to in FIG. 5 can comprise base station 108, the one or more access terminals referred to in FIG. 5 can comprise one or more of access terminals 114, 116, 118, and the air interface referred to in FIG. 5 can comprise RF air interface 120.

Block 502 includes a base station (e.g., base station 108) detecting initiation of a silence interval for a reverse-link air interface (e.g., RF air interface 120), wherein one or more access terminals (e.g., one or more of access terminals 114, 116, 118) are synchronized with the base station to detect initiation of the silence interval. Each of the one or more access terminals refrain from transmitting on the reverse-link air interface during the silence interval unless transmitting an access probe to initiate an emergency communication. Refraining from transmitting on the reverse-link air interface during the silence interval may include refraining from transmitting on the reverse-link air interface during a portion of a preceding non-silence interval if transmission of communications during the non-silence interval would overlap with the silence interval.

Synchronization of base station 108 and the one or more access terminals may be carried out in various ways. In one respect, base station 108 may transmit a sync channel message to the one or more access terminals via a forward-link sync channel of RF air interface 120. The sync channel message may comprise various data including timing data that the one or more access terminals can use to synchronize with base station 108 to detect initiation of silence intervals for RF air interface 120. In another respect, the one or more access terminals may be programmed to synchronize with base station 108 without having to receive a sync channel message from base station 108.

Next, block 504 includes, during the silence interval, the base station initiating a measurement. The measurement may include any of a variety of measurements. For example, the measurement may comprise a spectral noise density measurement that is also known as a noise power spectral density measurement or noise power measurement. Measurement data obtained from a spectral noise density measurement may be associated with units such as watts/hertz (Hz) or milliwatts/Hz. As another example, the measurement may comprise a thermal noise measurement. Measurement data obtained from a thermal noise measurement may be associated with units such as watts, dBm, a root mean square (RMS) voltage, dBμV, or some other units.

The measurement data obtained from a spectral noise density measurement or a thermal noise measurement may be combined with measurement data obtained from a measurement made during a non-silence interval. The measurement data may be combined to form a ratio such as $E_b/N_o$. Access terminal 300 may use the ratio to determine a power level that transceiver 302 and/or transmitter 310 should operate.

Base station 108 may not complete a measurement initiated at block 504. For example, base station 108 may not complete the measurement if base station 108 receives an access probe from one or more access terminals (e.g., one or more of access terminals 114, 116, 118) during the silence interval. In this way, base station 108 may not store any measurement data into data storage device 414 for the terminated measurement.

Next, block 506 includes, during the silence interval, the base station monitoring the reverse-link air interface to determine whether any of the one or more access terminals transmitted an access probe via the reverse-link air interface during the silence interval. Since the base station typically monitors the reverse-link during non-silence intervals, the transceiver 302 and/or receiver 312 may monitor the reverse-link air interface during both non-silence intervals and silence intervals to determine whether an access probe has been transmitted to base station 108.

Making the determination at block 506 may be carried out in various ways. In one respect, making the determination may include determining whether any access probe is received at base station 108, transceiver 302, and/or receiver 312 during the silence interval. Making this determination may be carried out without parsing the access probe received during the silence interval to obtain destination identifier data contained within the access probe.

In another respect, making the determination at block 506 may include processor 404 parsing the access probe received during the silence interval to obtain destination identifier data contained within the access probe, and comparing the destination identifier data of the access probe to destination identifier data obtained in data storage device 406. In this regard, the destination identifier data contained in data storage device 406 may comprise data associated with an emergency services telephone number such as 911. If the destination identifier data of the access probe matches destination identifier data contained in data storage device 406, base station 108 and/or processor 404 may generate an access probe acknowledgment (e.g., access probe acknowledgment 264) for transmission to the access terminal that transmitted the access probe.

If base station 108 determines that at least one of the one or more access terminals transmitted an access probe via the reverse-link air interface of RF air interface 120 during the silence interval, then base station 108 may terminate the measurement (initiated at block 504) before completion of the measurement. On the other hand, if base station 108 determines that the one or more access terminals did not transmit an access probe via the reverse-link air interface of RF air interface 120 during the silence interval, then base station 108 may complete the measurement (initiated at block 504) during the silence interval.

Figure 6:
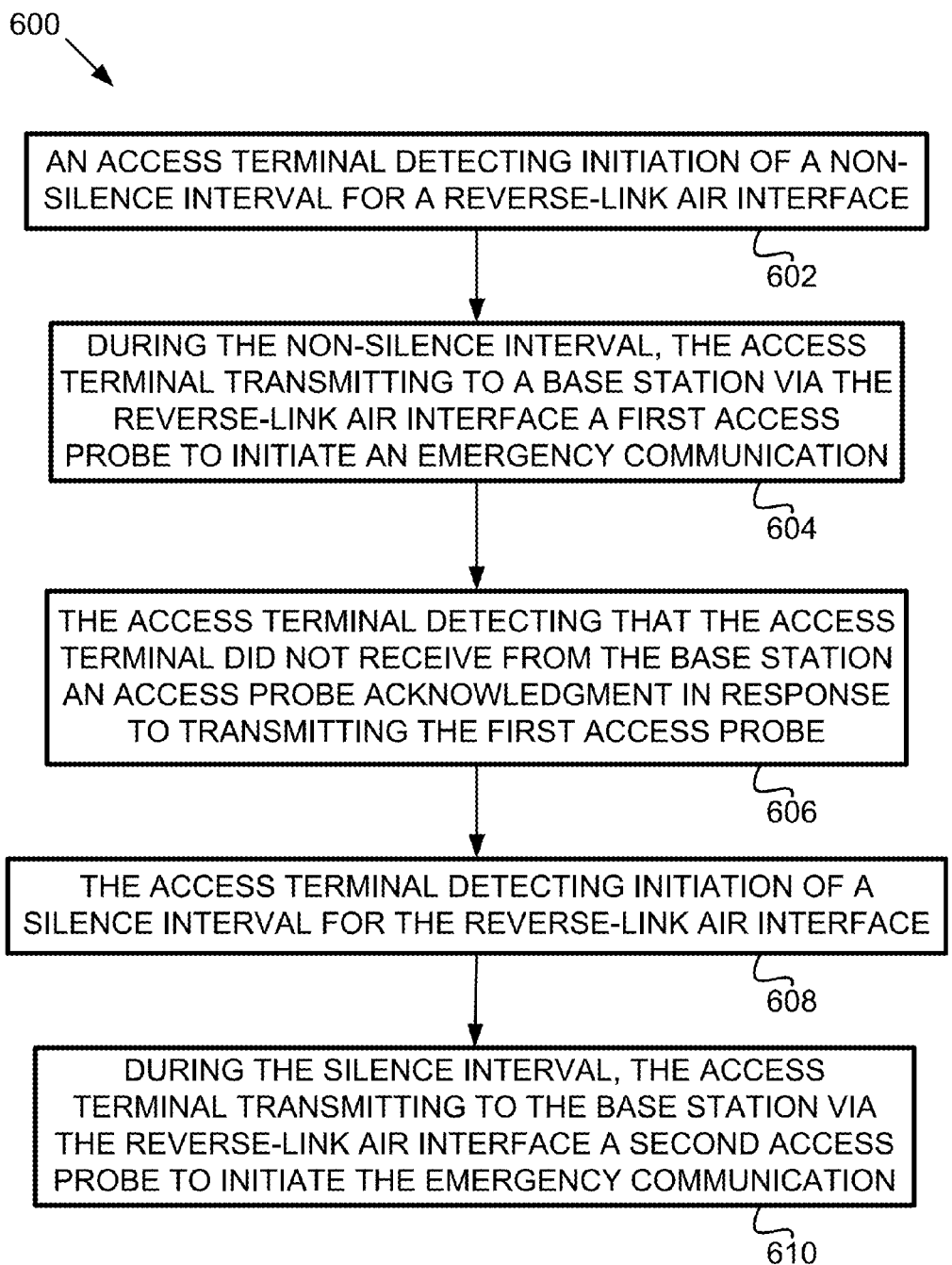
FIG. 6 is a flow chart depicting another set of functions that may be carried out in accordance with an example embodiment.

Turning to FIG. 6, a flow chart illustrating a set of functions 600 that may be carried out in accordance with an example embodiment is provided. The set of functions 600 in FIG. 6 refer to a base station, an access terminal, and an air interface. For purposes of this description, the base station referred to in FIG. 6 can comprise base station 108, the access terminal referred to in FIG. 6 can comprise any of access terminals 114, 116, 118, and the air interface referred to in FIG. 6 can comprise RF air interface 120.

Block 602 includes an access terminal (e.g., access terminal 114) detecting initiation of a non-silence interval (e.g., non-silence interval 238) for a reverse-link air interface (e.g., RF air interface 120). Detecting initiation of the non-silence interval may coincide with and/or as a result of detecting termination of silence interval 236. Detecting initiation of non-silence interval 238 or termination of silence interval 236 may be based on timing data access terminal 114 receives from base station 108 via a sync channel message. Processor 306 may execute program instructions to detect initiation of the non-silence interval.

Next, block 604 includes, during the non-silence interval, the access terminal transmitting to a base station via the reverse-link air interface a first access probe to initiate an emergency communication. The first access probe may comprise destination identifier data that indicates a telephone number, an e-mail address, a URL or some other destination identifier data for initiating the emergency communication.

Next, block 606 includes the access terminal detecting that the access terminal did not receive from the base station an access probe acknowledgment in response to transmitting the first access probe. Access terminal 114 may carry out the detecting function of block 606 during the non-silence interval and/or during a silence interval that follows the non-silence interval.

Next, block 608 includes the access terminal detecting initiation of a silence interval (e.g., silence interval 240) for the reverse-link air interface. Detecting initiation of silence interval 240 may coincide with and/or as a result of detecting termination of non-silence interval 238. Detecting initiation of silence interval 240 or termination of non-silence interval 238 may be based on timing data access terminal 114 receives from base station 108 via a sync channel message. Processor 306 may execute program instructions to detect initiation of the silence interval.

Next, block 610 includes, during the silence interval, the access terminal transmitting to the base station via the reverse-link air interface a second access probe to initiate the emergency communication. The emergency communication may comprise an emergency voice call, such as a voice call placed to an emergency telephone number 911, a text message transmitted to the emergency telephone number, an emergency communication transmitted to a network address of packet-switched network 106, such as a network address associated with a PSAP, or some other communication.

Transmitting the second access probe may be contingent on processor 306 executing program instructions to compare destination identifier data contained in the first access probe to destination identifier data 316. If processor 306 determines that the destination identifier data contained in the first access probe matches destination identifier data 316 (or a destination identifier in destination identifier data 316), then access terminal 114 may transmit the second access probe. On the other hand, if processor 306 determines that the destination identifier data contained in the first access probe does not match destination identifier data 316 (or a destination identifier in destination identifier data 316), then access terminal 114 may refrain from transmitting the second access probe.

After transmission of the second access probe, base station 108 may transmit an access probe acknowledgment in response to receiving the second access probe. Base station 108 may transmit other forward-link communications, such as a traffic channel assignment message, that access terminal 114 uses in establishing and carrying out the emergency communication.

Example embodiments of the present invention have been described above. Those skilled in the art will understand that changes and modifications may be made to the described embodiments without departing from the true scope and spirit of the present invention, which is defined by the claims.

We claim:

1. A method comprising:
    detecting, using a base station, initiation of a silence interval during which an access terminal refrains from communicating on a reverse-link to the base station unless communicating on the reverse-link for an emergency communication;
    initiating, using the base station, a measurement during the silence interval; and
    terminating, using the base station, the measurement before completion of the measurement in response to the base station detecting receipt of a communication from the access terminal during the silence interval.

2. The method of claim 1, further comprising:
    transmitting, using the base station, a sync channel message to the access terminal via a forward-link sync channel,
    wherein the sync channel message comprises timing data the access terminal can use to synchronize with the base station for detecting initiation of the silence interval.

3. The method of claim 2, wherein the timing data comprises data the access terminal can use to synchronize with the base station for detecting termination of the silence interval.

4. The method of claim 1, further comprising:
    transmitting, using the base station, an access probe acknowledgement in response to the base station detecting receipt of a communication from the access terminal during the silence interval,
    wherein the communication from the access terminal during the silence interval comprises an access probe to initiate an emergency communication.

5. The method of claim 1, wherein the measurement comprises a spectral noise density measurement.

6. The method of claim 1, wherein the measurement comprises a thermal noise measurement.

7. A method comprising:
    transmitting, using an access terminal during a non-silence interval for a reverse-link air interface, a first access probe to initiate an emergency communication;
    detecting, using the access terminal, the access terminal did not receive an access probe acknowledgment in response to transmitting the first access probe;
    detecting, using the access terminal, initiation of a silence interval for the reverse-link air interface; and
    transmitting, using the access terminal during the silence interval, a second access probe to initiate the emergency communication.

8. The method of claim 7, wherein detecting the access terminal did not receive the access probe acknowledgment in response to transmitting the first access probe occurs during the non-silence interval.

9. The method of claim 7, wherein detecting the access terminal did not receive from the base station the access probe acknowledgment in response to transmitting the first access probe occurs during the silence interval.

10. The method of claim 7, further comprising:
    receiving, using the access terminal, an acknowledgment message sent in response to transmitting the second access probe to initiate the emergency communication; and
    transmitting, using the access terminal, communications to a base station for the initiated emergency communication.

11. The method of claim 10, wherein the communications transmitted to the base station for the initiated emergency communication comprise voice communications.

12. The method of claim 7, further comprising:
storing, using the access terminal, a telephone number within a data storage device, wherein the telephone number is associated with emergency communications, and
detecting, using the access terminal, the first access probe comprises telephone number data that matches the telephone number stored in the data storage device.

13. The method of claim 12, wherein the telephone number associated with emergency communications is 911.

14. The method of claim 7,
wherein the access terminal transmits the first access probe at a first power level,
wherein the access terminal transmits the second access probe at a second power level, and
wherein the second power level is greater than the first power level.

15. An access terminal comprising:
a processor;
a transceiver configured to transmit reverse-link communications to a base station via a reverse-link of an air interface and forward-link communications from the base station via a forward-link of the air interface; and
a data storage device storing computer-readable program instructions executable by the processor to (i) detect the transceiver transmitted a first access probe to the base station during a non-silence interval, detect initiation of a silence interval, and detect the transceiver has not received an access probe acknowledgment in response to the first access probe, and (ii) cause the transceiver to transmit, during the silence interval, a second access probe to the base station via the reverse-link of the air interface.

16. The access terminal of claims 15,
wherein the first access probe includes destination information for establishing an emergency voice call communication, and
wherein the data storage device comprises destination identifier data the processor compares to the destination information included within the first access probe.

17. The access terminal of claim 16, wherein the destination identifier data comprises at least one of an e-mail address and a uniform resource locator (URL).

18. The access terminal of claim 17, wherein the at least one of the e-mail address and the URL is associated with a public safety answering point, a police department, or a fire department.

19. The access terminal of claim 15, wherein the computer-readable program instructions are executable by the processor to detect termination of the silence interval.

20. The access terminal of claim 15, wherein the forward-link of the air interface and the reverse-link of the air interface are arranged according to a 1xEvDO wireless protocol.

* * * * *